United States Patent [19]
Toho

[11] Patent Number: 5,227,207
[45] Date of Patent: Jul. 13, 1993

[54] PHOTOCONVERTER

[75] Inventor: Makoto Toho, Yawata, Japan

[73] Assignee: Matsushita Electric Works, Ltd., Osaka, Japan

[21] Appl. No.: 643,183

[22] Filed: Jan. 18, 1991

[30] Foreign Application Priority Data

Jan. 26, 1990 [JP] Japan .................. 2-17131
Jan. 26, 1990 [JP] Japan .................. 2-17132

[51] Int. Cl.⁵ .................. B32B 33/00; H01J 65/08
[52] U.S. Cl. .................. 428/34.4; 428/690; 428/917; 428/305.5; 428/315.5; 428/312.6; 427/157; 252/301.4 F; 313/495; 313/486; 313/489
[58] Field of Search .................. 427/34.4, 34.5, 157, 427/64; 250/462.1; 313/485, 495, 486, 489; 428/690, 917, 304.4, 305.5 C, 306.6, 307.3, 314.2, 315.5 C, 315.7, 312.6 C; 252/301.4 F, 301.6 F

[56] References Cited

U.S. PATENT DOCUMENTS

| | | | |
|---|---|---|---|
| 4,691,140 | 9/1987 | Sakakibara et al. | 313/486 |
| 4,710,386 | 12/1987 | Fulger et al. | 426/28 |
| 4,719,386 | 1/1988 | Toho | 313/485 |
| 4,803,400 | 2/1989 | Peters et al. | 313/489 |
| 4,825,124 | 4/1989 | Sigai | 313/486 |

Primary Examiner—Ellis P. Robinson
Assistant Examiner—Charles R. Nold
Attorney, Agent, or Firm—Burns, Doane, Swecker & Mathis

[57] ABSTRACT

A photoconverter formed as a sintered coating on a glass tube substrate, the coating being of a sol with a matrix compound capable of forming a sol-gel film. The sol-gel film contains a matrix substance component permeable to visible light and an acid chloride containing luminous atoms. The sol-gel film is reduced by calcination and sintered to form the photoconverter. The photoconverter is easy to use and is capable of executing photoconversion with a high energy efficiency.

12 Claims, 14 Drawing Sheets

PHOTOCONVERTER

BACKGROUND OF THE INVENTION

This invention relates to a photoconverter and, more particularly, to a photoconverter for absorbing incident light from a radiation source to be excited and emitting light having larger wavelength of lower energy than that of the incident light on the basis of an emission peculiar to luminous atom, or on di-quantum or multi-quantum emission basis.

The photoconverter of the type referred to is capable of performing the emission peculiar to the luminous atom or the multi-quantum emission with the incident light from the radiation source for its photoconversion at a high energy efficiency, as provided, for example, on a periphery of a tube surrounding the radiation source, that is, on the inner or outer peripheral surface of a lamp tube in an event of an elongated or spherical lamp, and thus should find its usefulness when applied to lamps and the like.

DESCRIPTION OF RELATED ART

An example of generally utilized photoconverters is fluorescent substance used in fluorescent lamps. In such fluorescent lamps using the fluorescent substance as the photoconverter, their luminous efficiency reaches about 80 lm/W, which is relatively high among existing lamps. From the viewpoint of energy conversion efficiency, on the other hand, there has been a problem that the fluorescent lamp can utilize only about a quarter of the input energy while the fluorescent substance itself shows an efficiency of utilization of only less than one half of the input excitation light, and thus theoretically sufficient luminous efficiency has not been gained.

For solving the above problem, the present inventor Makoto Toho has suggested as disclosed in U.S. Pat. No. 4,719,386 (or corresponding U.K. Patent No. 2,167,428 or German Patent Offenlegungsschrift P 35 37 881.6) a photoconverter in which the luminous atoms having the atomistic property are fixed as dispersed among intermediate substances permeable to light. The intermediate substances are the luminous atoms are thus substantially individually isolated from one another so that, upon incident of light, the photoconverter is excited to cause each exciting photon to emit two or more photons to realize multi-quantum emission. In manufacturing this photoconverter, one of such working techniques as Langmuir's film forming method, superfine particle forming method, super alloy forming method, microfilm forming method and so on may be employed.

In manufacturing the photoconverter with such working technique as in the above, however, there has been a problem with respect to the production efficiency and economics as well. It has been desirable that substantially the same level of the production efficiency and economy as the fluorescent substance in the ordinary fluorescent lamp, which emits light with luminous ultraviolet ray due to a low pressure mercury discharge irradiated and converted into the visible light, will be realized. That is, in the manufacturing method of the ordinary fluorescent lamps, it has been only necessary to apply a solution of the fluorescent substance onto the inner surface of a glass tube, to dry and fire the applied solution, and thereafter to tightly seal mercury and rare gases in the glass tube, which results in extremely highly efficient production. This raises the demand for the manufacture of a photoconverter as easy to use as the fluorescent substance in such fluorescent lamps.

SUMMARY OF THE INVENTION

A primary object of the present invention is, therefore, to provide a photoconverter in which the luminous atoms are fixed in an atomic energy level state, the atoms being individually isolated within a solid member, for an emission peculiar to the luminous atoms, or for di-quantum or multi-quantum emission. The photoconverter is as easy to use as fluorescent substance used in the fluorescent lamps, while being capable of being manufactured through similar steps to those in methods for manufacturing the fluorescent substance which leads to a highly efficient industrial producibility.

This object of the present invention can be attained by a photoconverter for emissions peculiar to the luminous atoms or, di-quantum emission in which luminous substances includes atoms in a energy level state at least close to the atomic energy level of the luminous atoms and in a fixed state substantially individually isolated within a matrix substance component, the substrate component being permeable to visible light, for absorption of incident light from a radiation source to be thereby excited to convert the incident light into a light of a longer wavelength than the incident light. The photoconverter including a sintered coating over a substrate consisting of a glass tube, the coating being of a mixture solution of a matrix compound capable of forming a sol-gel film. The sol-gel film contains a matrix substance component with an acid chloride compound containing the luminous atoms. Thereafter, the sol-gel is subjected to a calcination to be reduced and sintered into the photoconverter.

Other objects and advantages of the present invention shall be made clear in following description of the invention detailed with reference to embodiments shown in accompanying drawings.

While the present invention shall now be explained with reference to the embodiments shown in the drawings, it should be appreciated that the intention is not to limit the invention only to these embodiments shown but rather to include all modifications, alterations and equivalent arrangements possible within the scope of appended claims.

DETAILED DESCRIPTION OF THE PREFERRED EMBODIMENTS

Figures 1, 2:
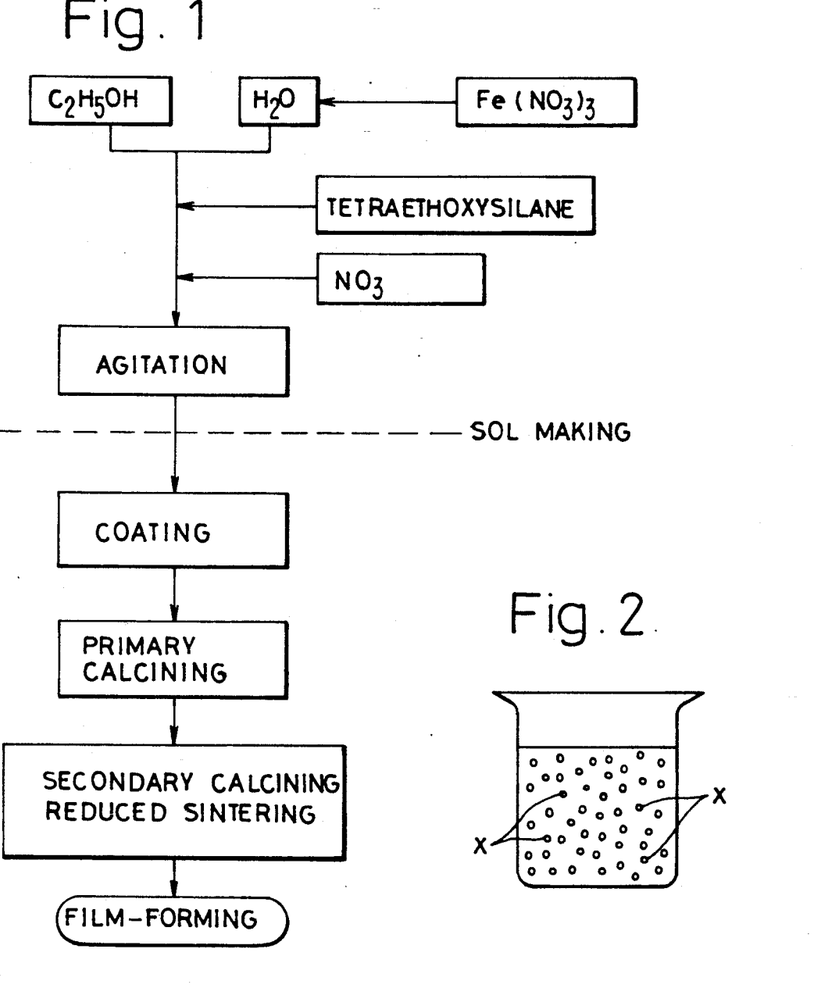
FIG. 1 is a diagram showing exemplary steps of a method for manufacturing the photoconverter in an embodiment according to the present invention.
FIG. 2 is a diagram showing schematically the state of sol attained in a sol forming step of FIG. 1.

Referring to FIG. 1 showing exemplary steps for manufacturing the photoconverter according to the present invention, a mixture solution is obtained first by mixing such metallic atom salt of desired luminous atom as ferric nitrate $Fe(NO_3)_3$ containing Fe atom with water $H_2O$ and such alcohol as ethanol $C_2H_5OH$ in a mixture of proper amounts for rendering eventual density ratio of Fe atom versus $SiO_2$ molecular to be about 1:1,000 so that they will be at 1:1 in volume ratio or at a ratio adjacent thereto. Next, an equal amount or more of a matrix compound which can be a source material of a matrix substance, preferably tetraethoxysilane (as a source material of amorphous silica $SiO_2$, which will be the matrix substance of the photoconverter), is mixed with the above mixture solution, with several drops of such a source material of salt of the luminous atom as undiluted nitric acid added.

Eventual mixture solution is kept at normal temperatures, i.e., about 20° C. or as slightly heated to be, for example, in a range of about 50° to 60° C., and is agitated for a relatively long time, for example, several hours to a whole day and night. Through this agitation, the solution is made to be a sol, that is, such silica sol as shown preferably in FIG. 2, in which silica colloid x is present as dispersed in the solution.

Figure 3:
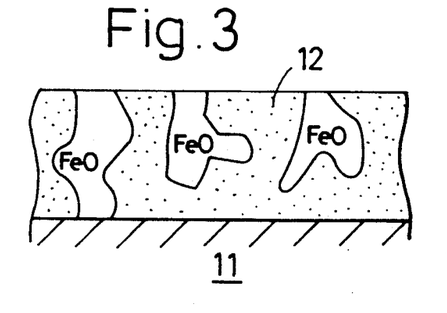
FIG. 3 is a schematic, fragmentary sectioned view of the film formed at the film forming step after a primary calcining step of FIG. 1.

Next, this mixture solution made into a sol is applied to a surface of a substrate, such as an inner surface of a lamp glass tube, so as to be a coating thereon, and then this substrate with the coating is heated in the atmosphere at a higher temperature, for example, about 500° C. for 1 to 2 hours, to execute a primary calcination, during which the coating is decomposed into a matrix substance 12 consisting of amorphous silica SiO having a number of microfine pores and $Fe(NO_3)_3$ retained in the pores, the latter of which is eventually caused to produce FeO with $NO_x(NO_2)$ scattered, as shown in FIG. 3, in which a numeral 11 denotes the substrate.

Next, the substrate 11 on which the matrix substance 12 is fixed is subjected to a secondary calcination in an atmosphere of carbon monoxide or hydrogen or the like atmosphere, at such a high temperature as 100° to 1,000° C. for a relatively short period, so as to be reductively sintered, and a photoconverter is produced as a sintered film on the substrate 11. In this event, it will be appreciated by any one skilled in the art that the calcining temperature history is subjected to a preliminarily set administration or a feedback administration for rendering the film to be of a desired size in the pores in which the luminous atoms are contained.

Figure 4:
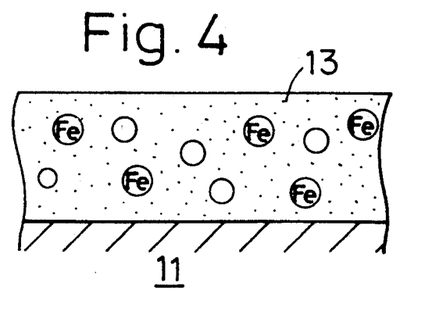
FIG. 4 is a schematic, fragmentary sectioned view of the photoconverter obtained after a secondary calcining step in FIG. 1.

In the photoconverter produced as reductively sintered, only Fe in FeO is reduced, Fe atoms are retained in the microfine pores of the matrix substance 12 as made individually independent, and such a fixed film 13 as shown in FIG. 4 is caused to be formed on the substrate 11. When ultraviolet ray emitted by a mercury discharge is made incident on this photoconverter in the form of this fixed film 13, the luminous atoms absorb this ultraviolet ray to be thereby excited to cause an emission transition to occur, and the film can be utilized as a fluorescent substance which emits a desired visible light.

Figure 5:
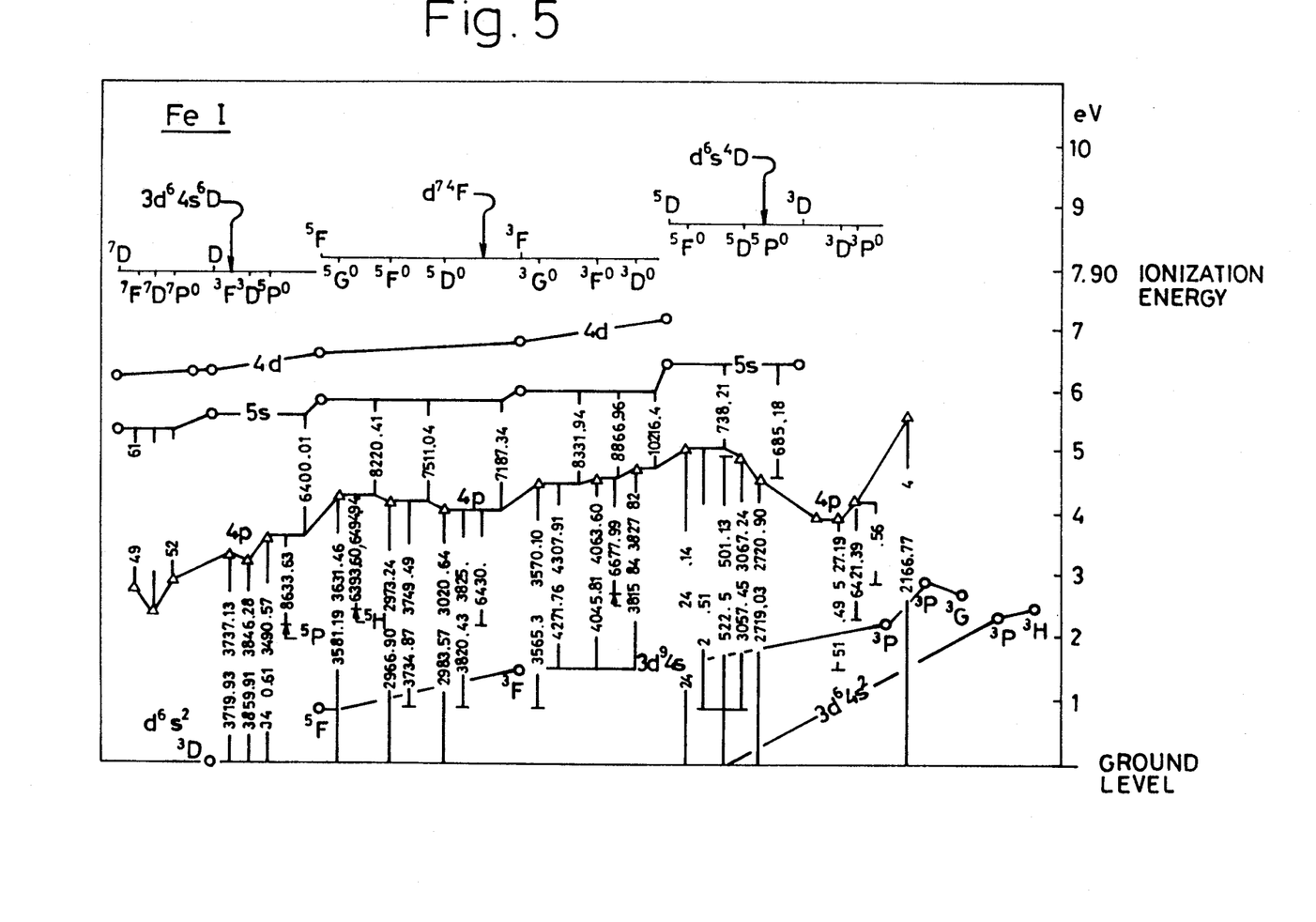
FIG. 5 is a diagram for explaining the energy level of Fe atom employed in the embodiment of FIG. 1.
Figure 6:
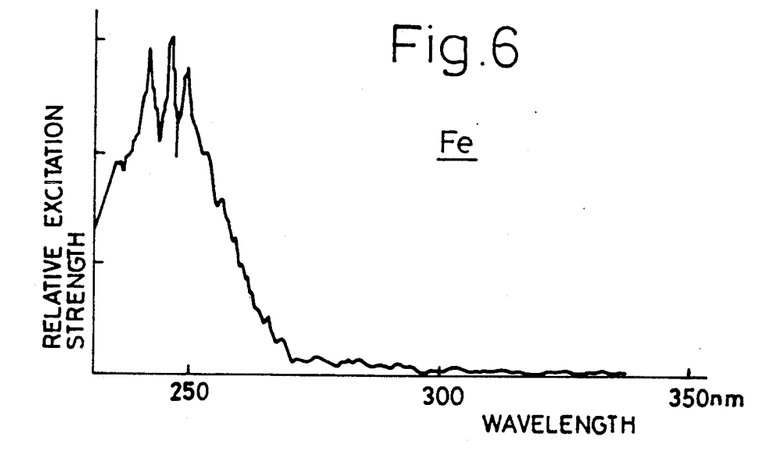
FIG. 6 is an explanatory diagram for excitation characteristics of the photoconverter obtained with Fe atom employed in the embodiment of FIG. 1.
Figure 7:
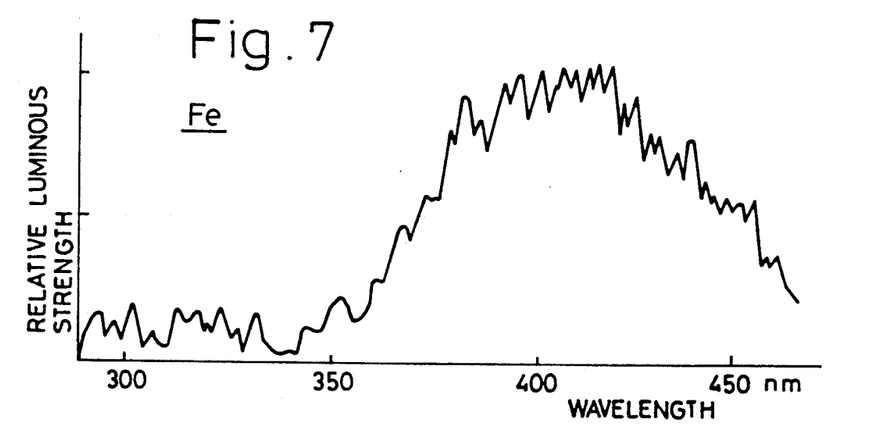
FIG. 7 is an explanatory diagram for luminous characteristics of the photoconverter obtained with Fe atom employed in the embodiment of FIG. 1.
Figure 8A:
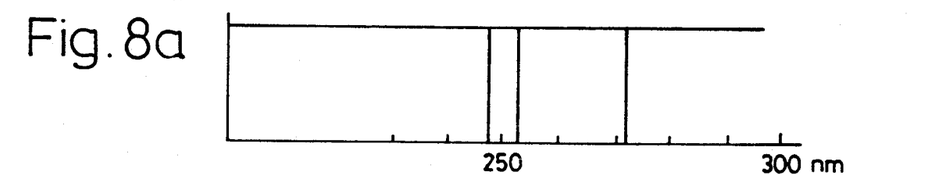
FIG. 8a is an explanatory diagram for absorption spectrum of Fe atom employed in the embodiment of FIG. 1.
Figure 8B:
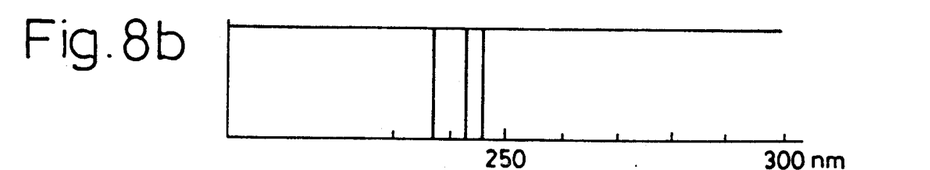
FIG. 8b is a diagram showing a main peak absorption spectrum for luminous atom of the photoconverter with Fe atom employed, as obtained through the steps of FIG. 1.

In the concrete, the ratio of the number of Fe atoms with respect to the number of Si atoms was selected to be 1:1,000 as the luminous intensity in obtaining the film in the embodiment of FIG. 1, in which event it has been found that the photoconverter obtained has shown the property of atomic state substantially corresponding to the energy level of Fe atom as shown in FIG. 5, that is, such excitation property of the relative excitation strength high with respect to the wavelength of around 240 nm as shown in FIG. 6, and such luminous property of the relative luminous strength high with respect to the wavelength of around 450 nm. In this case, three absorption spectra appearing in the excitation property shown in FIG. 6 are characteristic to Fe atom, while the absorption spectrum of Fe atom itself should appear around the wavelength of 250 nm and 270 nm as shown in FIG. 8a. In the photoconverter according to the present invention, on the other hand, a slight deviation of 10 to 20 nm is caused to occur in the energy level due to a weak van der Waals coupling of Fe atom to adjacent silica substance, so as to cause the absorption spectra to appear around 240 to 250 nm of the wavelength as shown in FIG. 8b and thus to attain the socalled atomic state which is closer to the atom rather than Fe atom itself. However, as will be appreciated, the photoconverter of the present invention allows a blue color emission of the wavelength of 400 to 450 nm peculiar to Fe atoms with the excitation of the ultraviolet ray to be highly efficiently obtained as in FIG. 7 due to the main luminous ultraviolet ray of 254 nm by means of low pressure mercury discharge, so that the photoconverter will be extremely useful as the fluorescent substance for use in the fluorescent lamp.

In the steps of FIG. 1, it is possible to execute a film form control in respect of such finishing conditions of the film 13 as the density, film thickness, extent of the atomic state and so on, by means of an addition of any additives for controlling the porous distribution (size or diameter of pores and degree of dispersion), setting of the ratio of the number of the luminous atoms versus the number of the matrix atoms, setting of the concentration of the solution or the number of application of the solution for forming the coating and eventually the film, temperature regulation, controlling of sintering temperature history and so on, as occasion demands. On the other hand, it is also possible to freely vary the fluorescent color by altering the luminous atom itself, and an emission peculiar to the luminous atoms or a di-quantum emission can be realized highly efficiently by employing different ones of the luminous atoms, as has been also disclosed in the foregoing U.S. Pat. No. 4,719,386.

Figure 9:
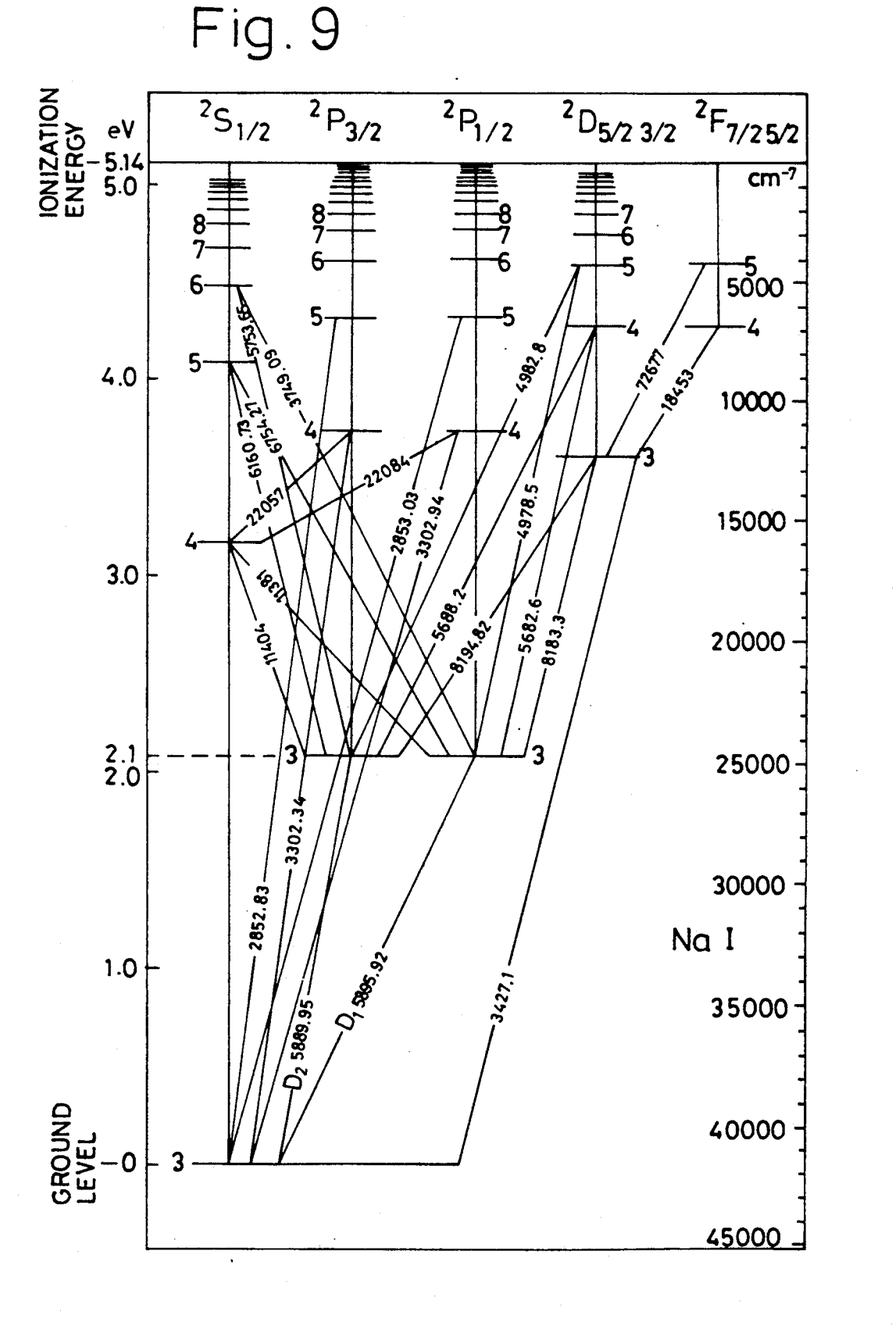
FIG. 9 is an explanatory diagram for transition emission of Na atom employed in the embodiment of FIG. 1.
Figures 10, 12:
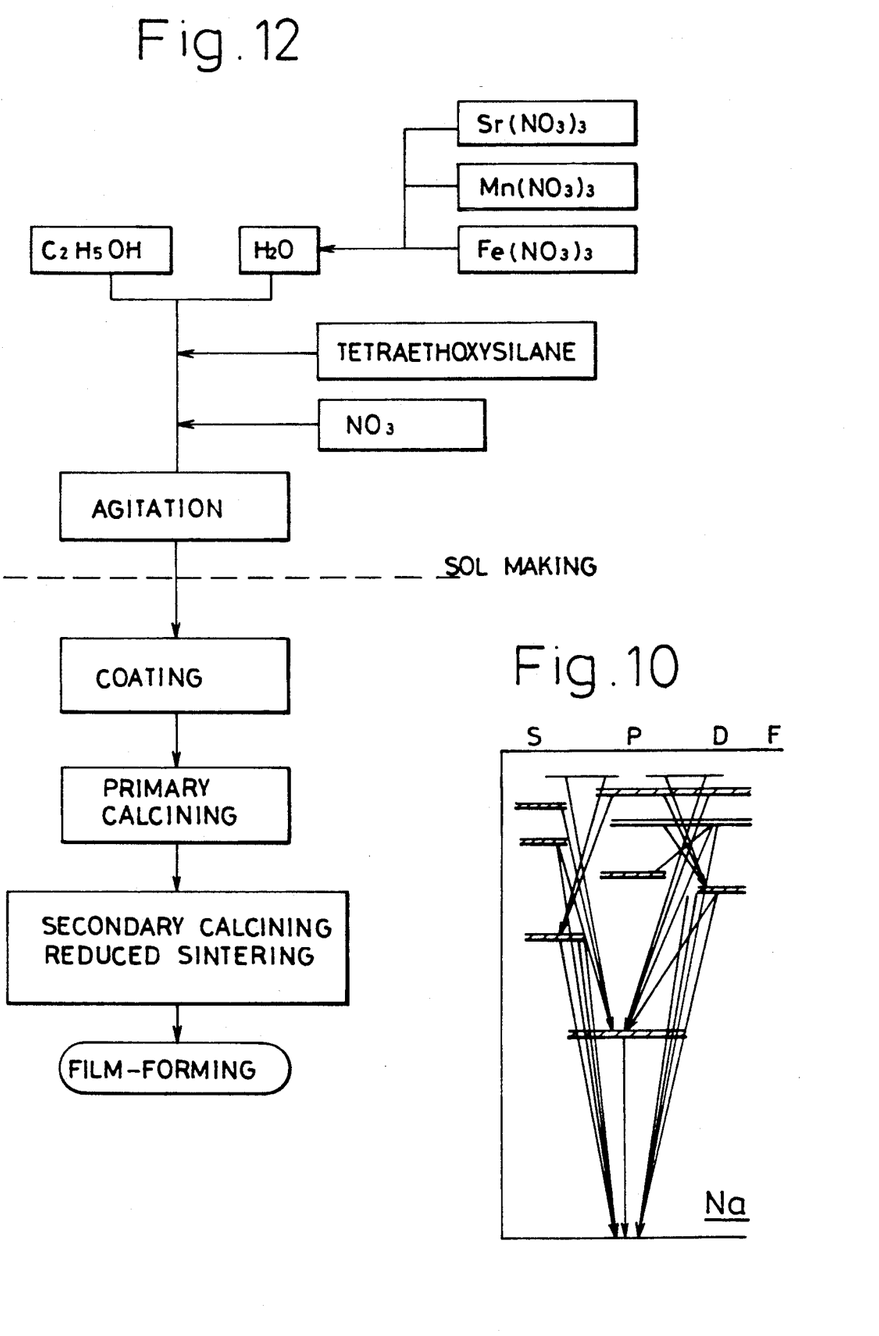
FIG. 10 is an explanatory diagram for the transition emission of Na atom employed in the embodiment of FIG. 1 as fixed in atomic state.
FIG. 12 is a diagram showing another exemplary steps for manufacturing the photoconverter in another embodiment according to the present invention.
Figure 11:
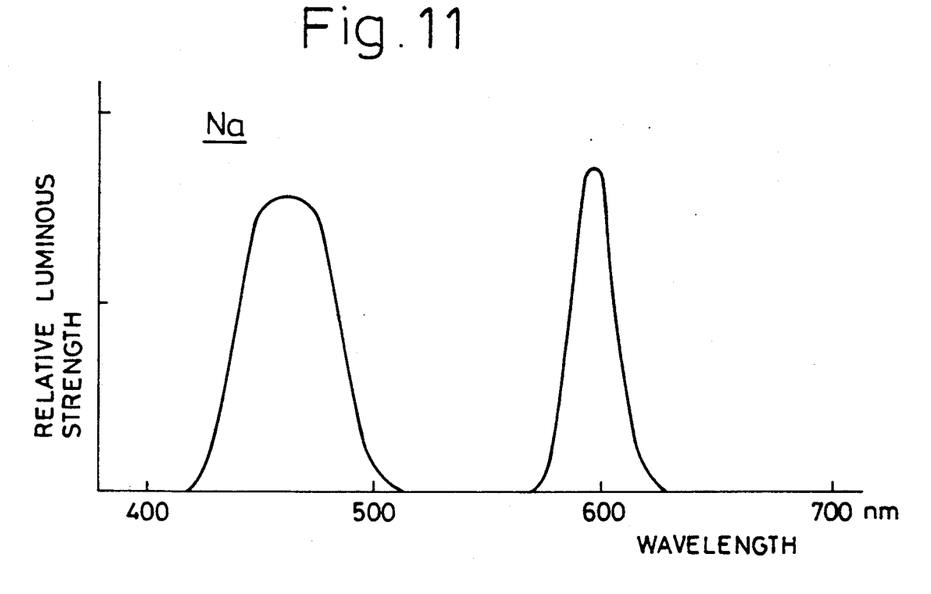
FIG. 11 is an explanatory diagram for the luminous characteristics of the photoconverter obtained with Na atom employed in the embodiment of FIG. 1.

When the thin film is formed in accordance with the exemplary steps of FIG. 1 with the sol formed by a desired metallic atom salt and the luminous atom of, for example, Na atom, this luminous atom is caused to execute the emission transition as in FIG. 9, and such emission transition as in FIG. 10 which presenting a slight energy shift and broadening is made to be shown by fixing Na atom in the atomic state. When an ultraviolet ray of 254 nm having an energy of about 4.9 V is made incident on this film, the light is excited highly efficiently to a higher excitation level of the same energy, for example, to a P series level. The thus excited energy is subjected to a transition therefrom to an adjacent S or D series due to level overlapping of Na atom with an adjacent series, a blue series visible radiation transition of a first step therefrom to 3P1/2 and 3P2/3 levels and sequentially a yellow series resonance radiation transition of a second step from the same level to the ground level are highly efficiently caused to occur. Such visible light emission peculiar to the luminous atoms or di-quantum visible light emission as shown in FIG. 11 can be efficiently performed. For the luminous atoms, it is of course possible to selectively employ any other atoms than the foregoing Fe and Na atoms.

Referring next to FIG. 12 showing another exemplary steps for manufacturing the photoconverter in another embodiment, three different luminous atoms contributive to respective colored emission of red R, green G and blue B are fixed in the atomic state.

Figure 13:
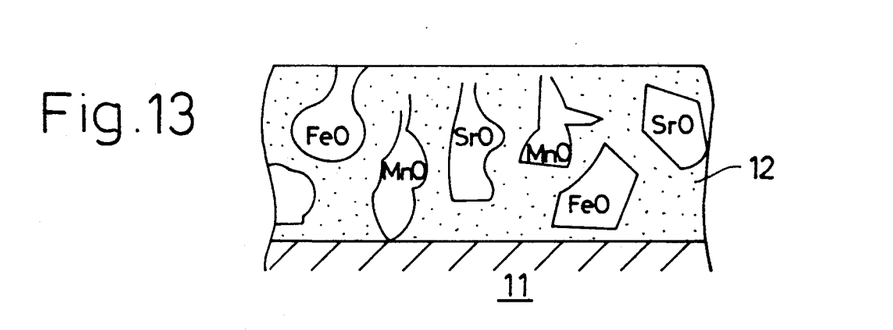
FIG. 13 is a schematic, fragmentary sectioned view of the film formed at the primary calcining step in the steps of FIG. 12.
Figure 14:
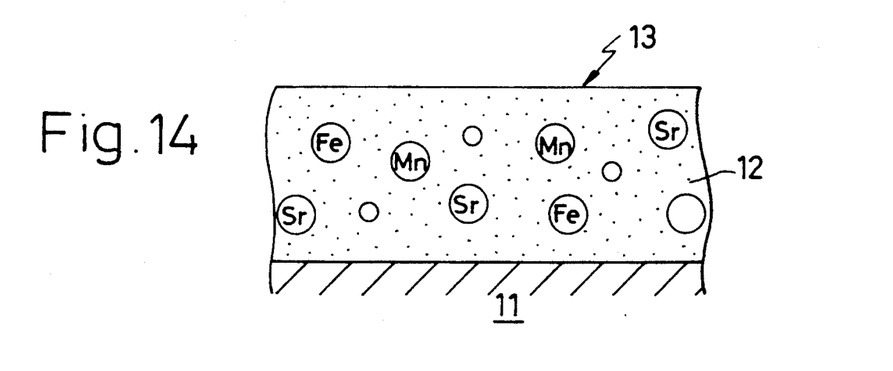
FIG. 14 is a schematic, fragmentary sectioned view of the photoconverter obtained after the secondary calcining step in the steps of FIG. 12.
Figure 15:
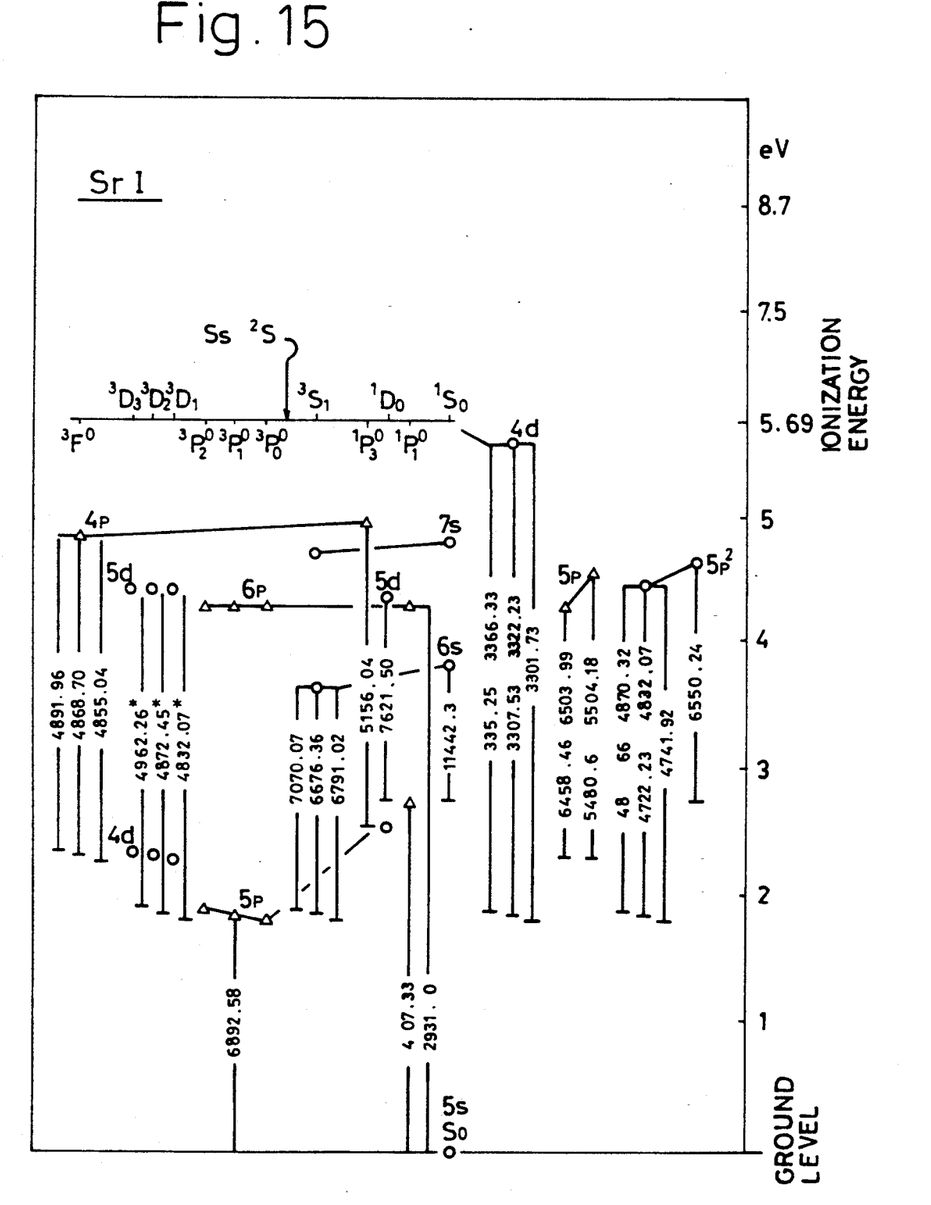
FIG. 15 is an explanatory diagram for the energy level of Sr atom employed in the embodiment of FIG. 12.
Figure 16:
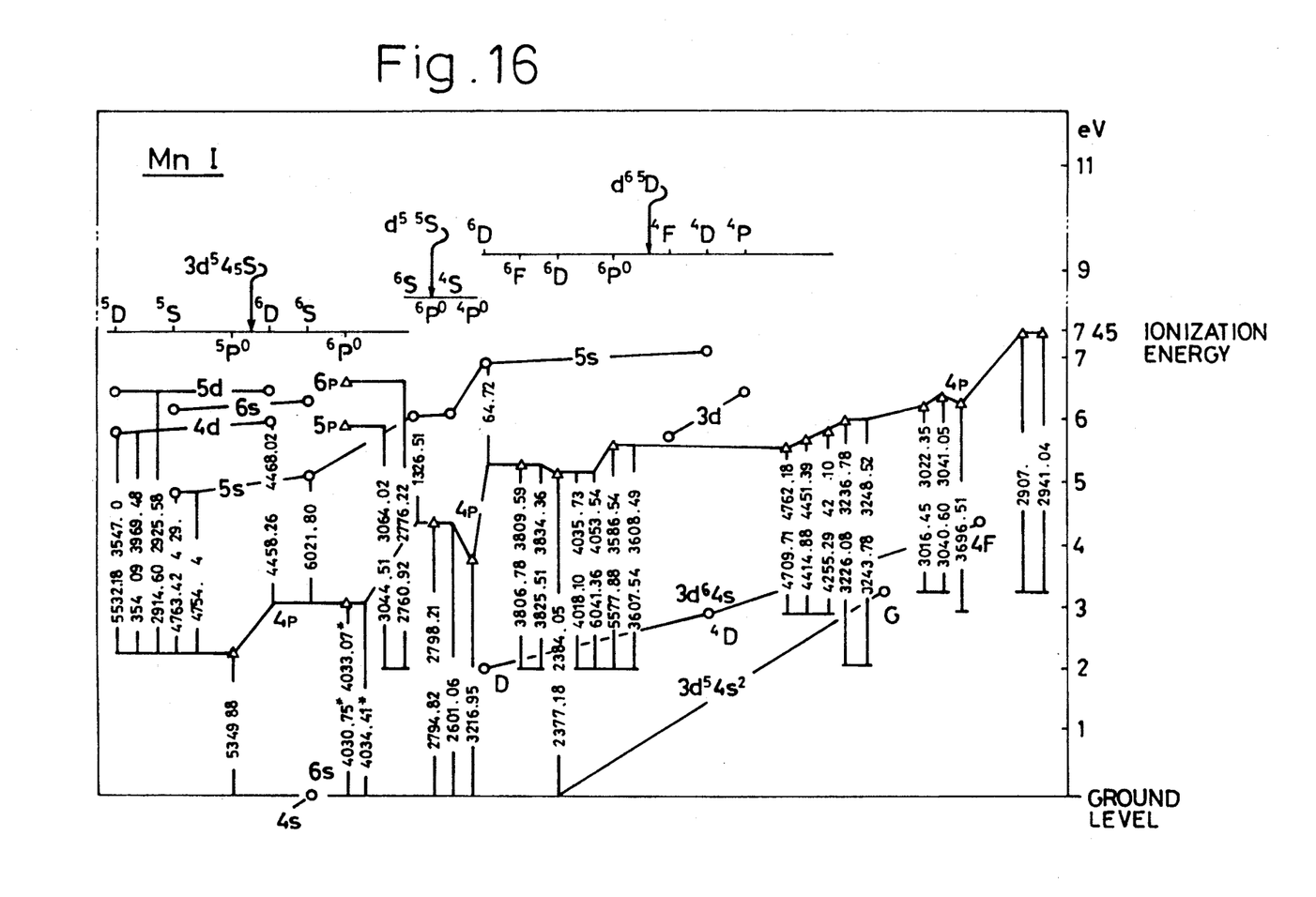
FIG. 16 is an explanatory diagram for the energy level of Mn atom employed in the embodiment of FIG. 12.
Figure 17:
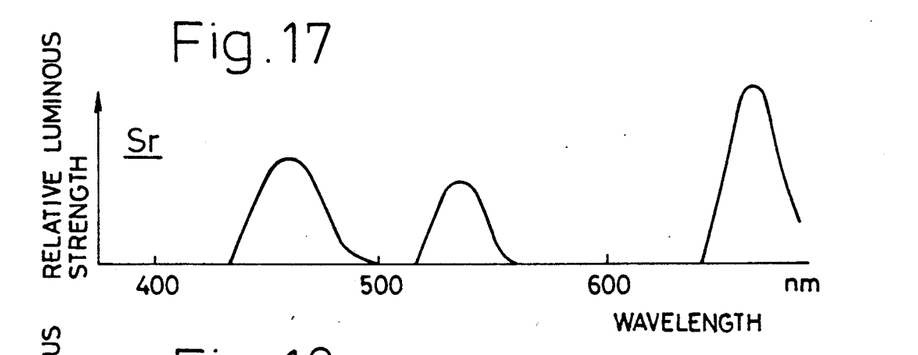
FIG. 17 is an explanatory diagram for the luminous characteristics of Sr atom employed in the embodiment of FIG. 12 and fixed in the atomic state.
Figure 18:
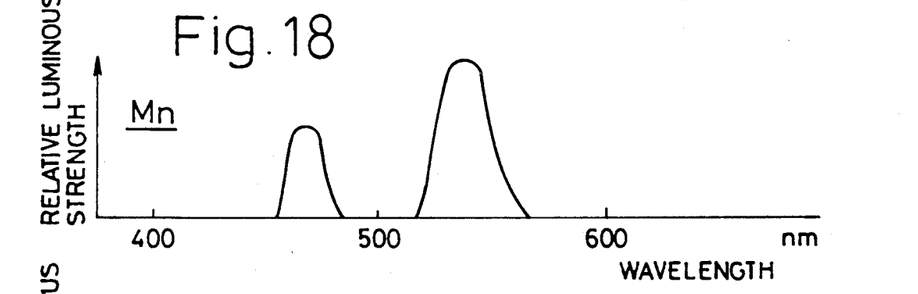
FIG. 18 is an explanatory diagram for the luminous characteristics of Mn atom employed in the embodiment of FIG. 12 and fixed in the atomic state.
Figure 19:
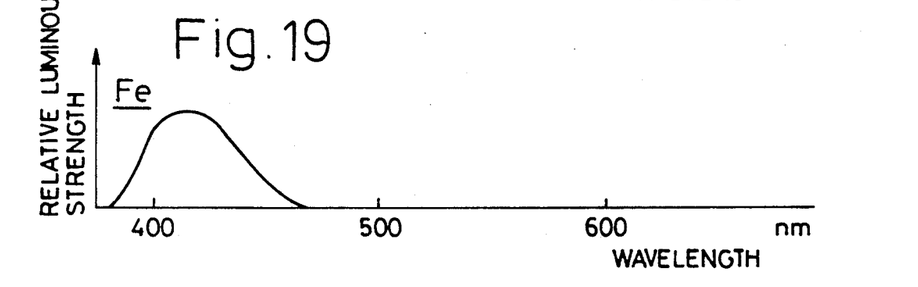
FIG. 19 is an explanatory diagram for the luminous characteristics of Fe atom employed in the embodiment of FIG. 12 and fixed in the atomic state.
Figure 20:
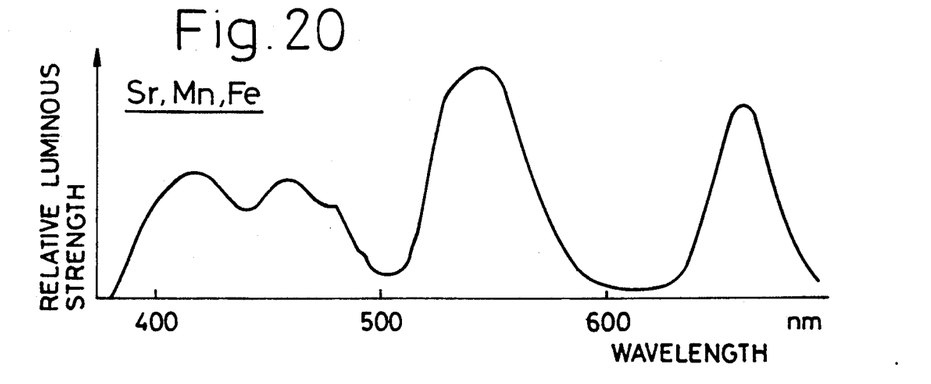
FIG. 20 is an explanatory diagram for the luminous characteristics of the photoconverter obtained through the steps of FIG. 12.

More specifically, in the present embodiment, the mixture solution of the metallic atom salt is prepared by mixing, in addition to $Fe(NO_3)_3$, $Sr(NO_3)_3$ and $Mn(NO_3)_3$ at such optimum radio as 1:2:1 in the atomic density ratio. This mixing step is followed by the same steps as those in FIG. 1. In the present instance, the three different metallic atoms oxidized after the primary calcination are made to be in mutually separated state as shown in FIG. 13. When the film 13 is attained on the substrate 11 through the secondary calcination for the reductive sintering, the three different luminous atoms are separately fixed in the atomic state as shown in FIG. 14. These three different atoms of Sr, Mn and Fe which are the respective luminous atoms for R, G and B are of such energy levels as shown in FIGS. 15 and 16 as well as FIG. 5 referred to with reference to the steps of FIG. 1. Due to their fixation in the atomic state, their excitation by the ultraviolet ray of 254 nm by means of the mercury discharge will cause the three different luminous atoms to execute respectively a fluorescent emission slightly vigorous in red, green or blue color as shown in FIG. 17, 18 or 19 while accompanying a slight energy shift. When these Sr, Mn and Fe atoms are mixed in a ratio of about 1:2:1 in the number of atoms, it is possible to obtain a photoconverter of a whitish emission as a whole and excellent in the color rendering with three primary colors R, G and B contained respectively at a proper amount as shown in FIG. 20.

Figure 21:
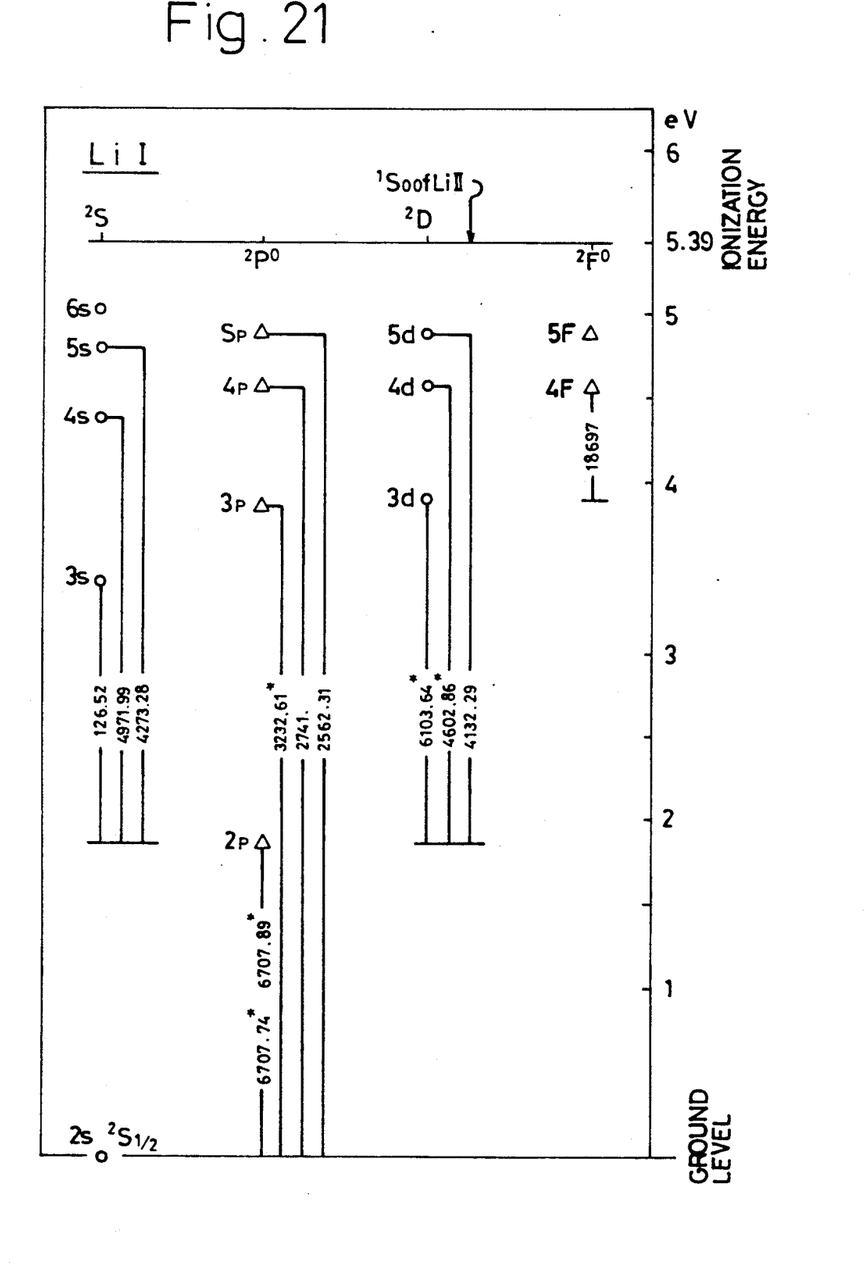
FIG. 21 is an explanatory diagram for the energy level of Li atom employed in the embodiment of FIG. 12.
Figure 22:
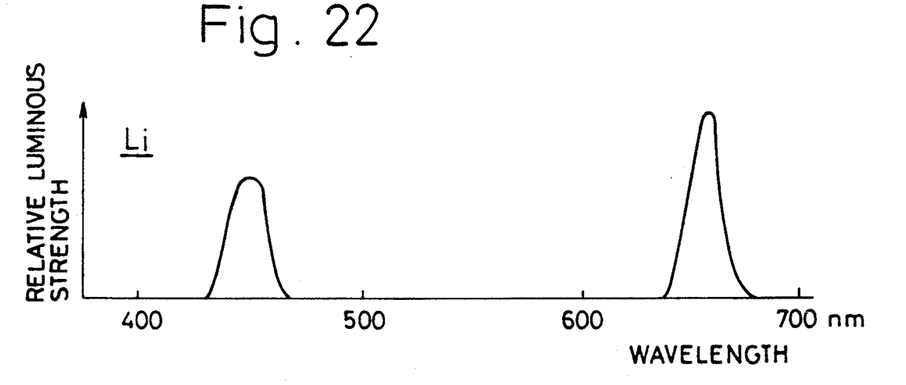
FIG. 22 is an explanatory diagram for the luminous characteristics of Li atom employed in the embodiment of FIG. 12 and fixed in the atomic state.
Figure 23:
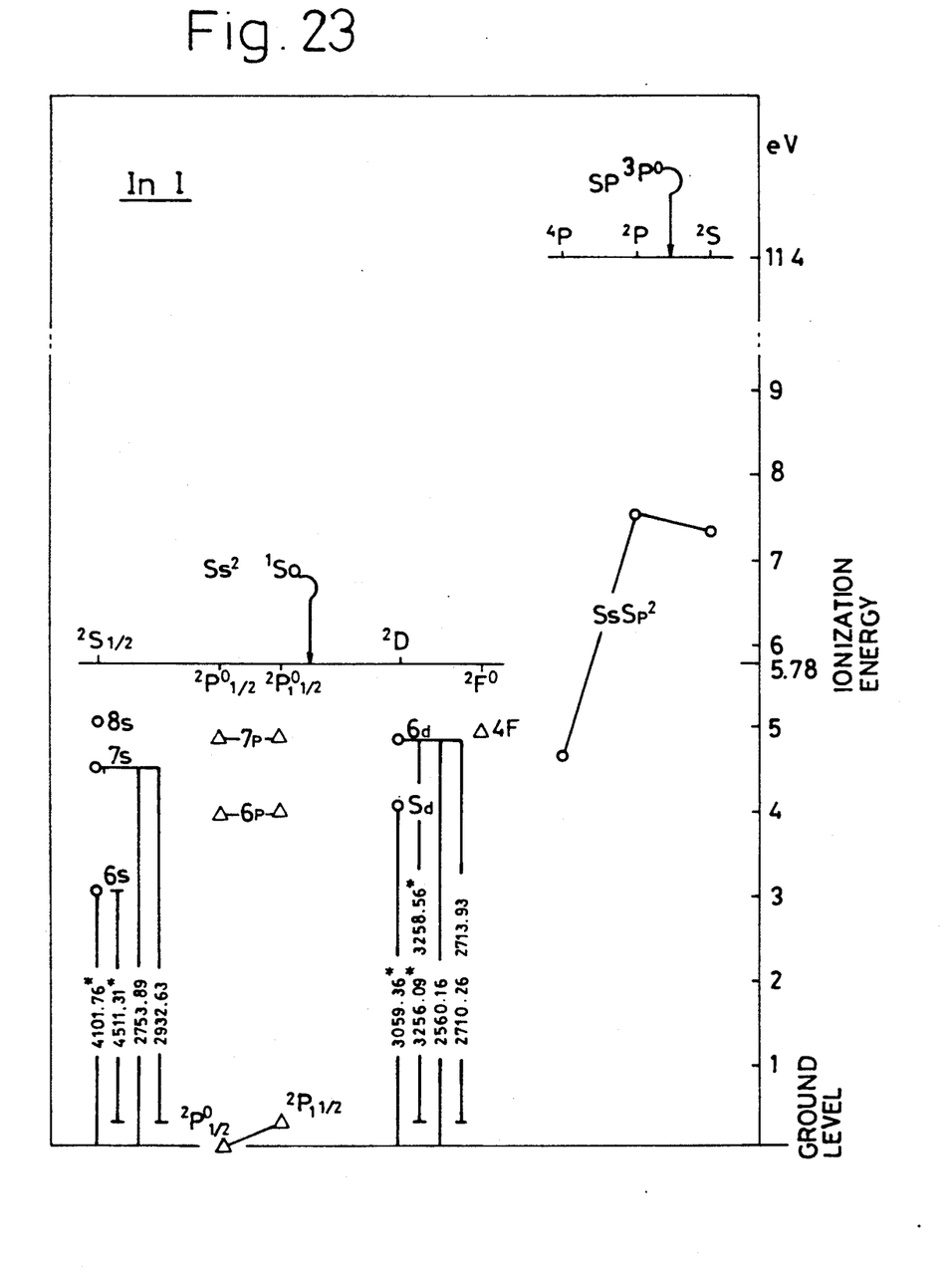
FIG. 23 is an explanatory diagram for the luminous characteristics of In atom employed in the embodiment of FIG. 12.
Figure 24:
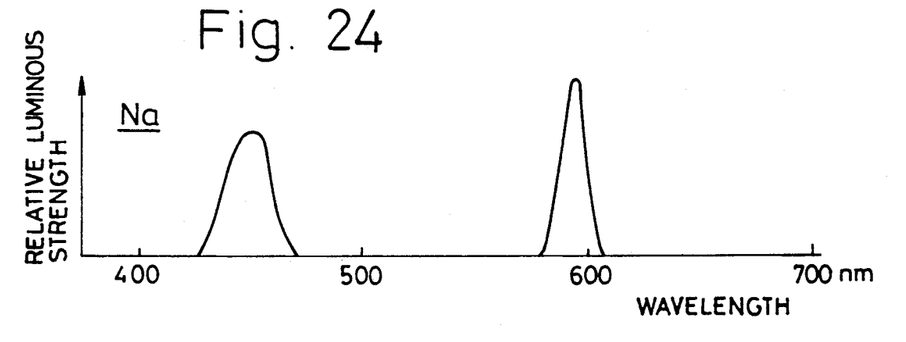
FIG. 24 is an explanatory diagram for the luminous characteristics of Na atom employed in the embodiment of FIG. 12 and fixed in the atomic state.
Figure 25:
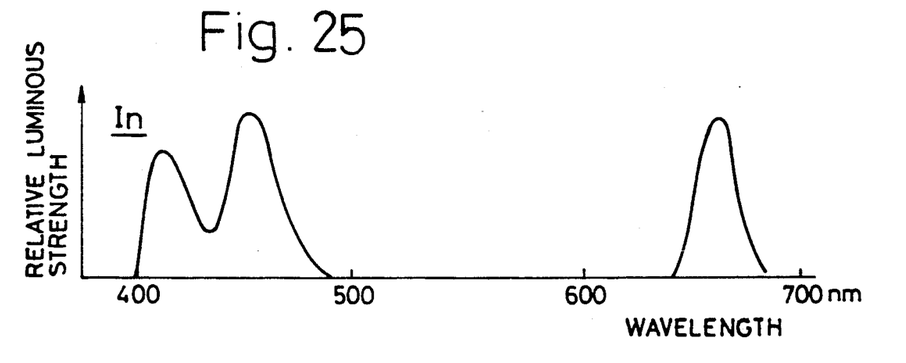
FIG. 25 is an explanatory diagram for the luminous characteristics of In atom employed in the embodiment of FIG. 12 and fixed in the atomic state.

Since, in this case, Sr and Mn atoms show the peculiar emission of the luminous atoms or the di-quantum or multi-quantum emission of a high efficiency, the photoconverter as a whole of the present embodiment provides an extremely highly efficient emission. Further, when Li atom showing such energy level as shown in FIG. 21 is employed in place of Sr atom, the Li atom as fixed in the atomic state is effective to show such fluorescent emission as shown in FIG. 22, and substantially the same effect as in the above can be attained. Further, it is also possible to substitute Na atom which provides an emission of such energy level as in FIG. 9 and such atomic state as in FIG. 24 or In atom which provides an emission of such energy level as in FIG. 23 and such atomic state as in FIG. 25 for Sr atom or Fe atom, with the same level of effect allowed to be expected. Any other luminous atoms than those described may be employed as desired.

It is also possible to obtain the photoconverter by combining only two different atoms which are vigorous in the emission of more than two among R, G and B, the emission of which photoconverter still maintaining effectively respective components of the three principal colors R, G and B. The respective atoms may be employed in such combinations as Sr and Mn atoms, Sr and Li atoms or In and Mn atoms.

It has been found that the foregoing luminous atoms provide such strong excitation and emission properties as shown in a following table, as being the atoms or in the atomic state.

TABLE

| Atom | Excitation $\rightarrow$ | Non-transition emission $\rightarrow$ | Transition emission |
|---|---|---|---|
| Sr | $5s \rightarrow 7p$ | 7s or 6d | $\overrightarrow{BG} 5p \overrightarrow{R} 5s$ |
| Mn | $3d \rightarrow 4p$ | 5s | $\overrightarrow{B} 4p \overrightarrow{R} 3d$ |
| Fe | $4s \rightarrow np\ (n \geqq 4)$ | 4p | $\overrightarrow{B} 4s$ |
| Li | $2s \rightarrow np\ (n \geqq 4.5)$ | ns or nd (n = 5.6) | $\overrightarrow{B} 2p \overrightarrow{R} 2s$ |
| Na | $3s \rightarrow np\ (n \geqq 7)$ | ns or nd (n $\geqq$ 7) | $\overrightarrow{B} 3p \overrightarrow{YO^*} 3s$ |
| In | $5p \rightarrow 8s$ or 6d | 7s | $\overrightarrow{R} 6s \overrightarrow{B} 5p$ |

(Remark*: YO = Yellowish Orange)

Figure 26:
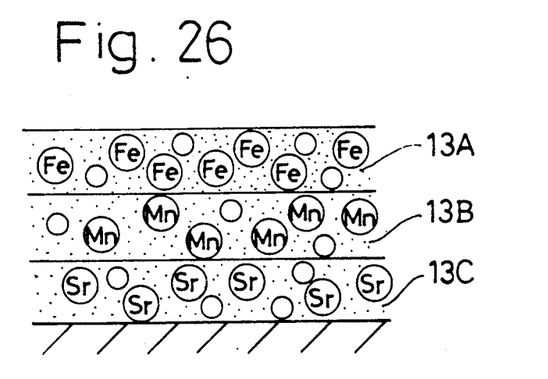
FIG. 26 is a schematic, fragmentary sectioned view of the photoconverter in another embodiment according to the steps of FIG. 12.

Further, it is also possible to form the photoconverter containing the more than two different luminous atoms without employing such mixing step of the more than two different metallic atom salts at the initial step of FIG. 12, but rather by forming sequentially each of three films with each of the metallic atom salts in the same manner as in the steps of FIG. 1 so as to stack respective films 13A, 13B, 13C . . . in respective which the different luminous atoms are separately contained as fixed to the atomic state as shown in FIG. 26. In carrying out the excitation by means of the ultraviolet ray of 254 nm with the mercury discharge, further, it is made possible to attain a highly efficient peculiar visible light emission of the luminous atoms or di-quantum or multi-quantum visible light emission by employing, as the luminous atoms, Al, Co, Sn, Ta, V, W, Hf, Mg, Ni, Re, Si, Y and so on, in addition to the luminous atoms of Na, Li, Sr, Mn, In and so on. In respect of the excitation, the use of the .ultraviolet ray due to the mercury discharge has been described in the above, but it is also possible to employ other visible light or ultraviolet ray of other wavelength or an excitation light source, while it is also possible to utilize an atom of a luminous property of invisibility in accordance with the object and use of the fluorescent emission. For example, a peculiar emission of luminous atoms or multi-quantum near ultraviolet emission may also be carried out with an ultraviolet ray irradiation from a xenon arc lamp with respect to the photoconverter in which Zn atom is fixed.

Figure 27:
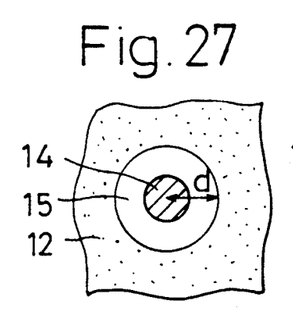
FIGS. 27 to 29 are diagrams for showing schematically respective models in which the photoconverter is produced, for explaining sintering temperature adjustment according to the present invention.
Figure 28:
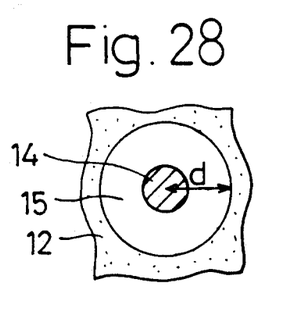
Figure 29:
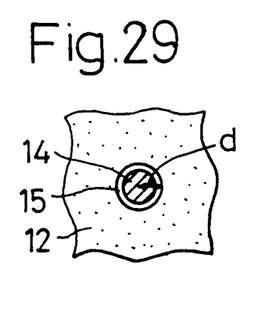
Figure 30:
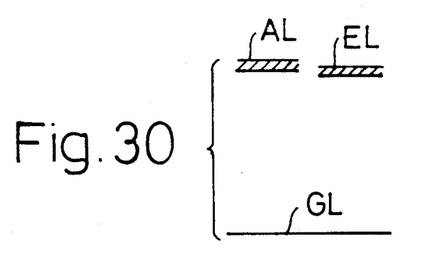
FIGS. 30 to 32 are diagrams showing energy shift models of the fixed luminous atom, corresponding to FIGS. 27 to 29.

According to another feature of the present invention, there can be provided an extremely useful photoconverter which can improve the probability of transition and thus can perform the peculiar emission of the luminous atoms or the di-quantum emission at a high efficiency. In an embodiment of this feature, pores 15 formed in the matrix substance 12 are made to have a diameter d whih is so set as to accommodate the luminous atom 14 for generating the most desirable transition, as shown in FIG. 27, at the step of secondary calcination for the reductive sintering in FIG. 1 or 12. In the case of the present embodiment, a proper selection of the temperature for the secondary calcination can be contributive to the formation of the photoconverter capable of achieving the highly efficient di-quantum emission. Here, the secondary calcining temperature which is too low will result in such excessively large diameter of the pore 15 as seen in FIG. 28, while the temperature too high will result in such too small diameter as in FIG. 29. In an event where the luminous atom 14 produced in the matrix substance 12 is accommodated in such pores 15 having a proper diameter, there is caused an extremely weak van der Waals coupling, that is, an extremely weak intermolecular coupling to occur between the luminous atom 14 and adjacent atoms or moleculars, so as to be fixed with the atomic state maintained, within the matrix substance 12. In other words, it will be appreciated that the diameter d of the pores 15 is so set as to cause the extremely weak van ver Waals coupling of the luminous atoms 14 with the adjacent atoms or moleculars.

In such state where the luminous atoms are fixed in the atomic state in which these atoms are in the extremely weak van der Waals coupling with the adjacent atoms or moleculars, mutually adjacent and equal energy excitation levels are superposed on the energy level of the luminous atoms, so that an optimum energy shift or broadening can be attained. With this energy level superposition, it is made possible to elevate the probability of transition, and the reasons therefor shall be described in detail.

Figure 34:
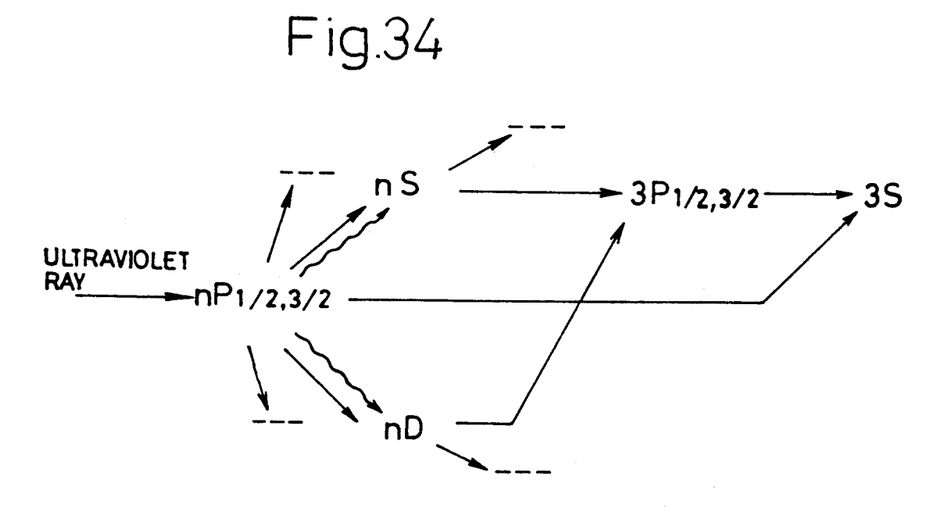
FIG. 34 is a diagram for explaining the radiative transition of Na atom in the excitation of ultraviolet light due to general mercury discharge.

It has been made known that, in the excitation energy level of the luminous atom, the radiation or absorption generally takes place in accordance with the "Pauli's exclusion principle" and only between the levels based on this principle. Strictly speaking, it has been found that the transition occurs only between the units of series which are different only by "1" in the number of main quanta (n), the units of series thus corresponding to n=1, 2, 3, . . . in the energy level while the series being denoted by such alphabetic characters as S, P, D, F, . . . , and no emission transition takes place between such series as S and D or S and F. Referring to FIGS. 9 and 10 showing the emission transition of Na atom and atomic state Na atom, for example, it is seen that the transition occurs without jumping width as drawn by each line in the drawings upon the optical excitation by the ultraviolet ray of 254 nm obtained by means of the mercury discharge in the case of the photoconverter in which Na atom is fixed in the atomic state. Here, the desired emission transition of the peculiar emission of the luminous atoms or di-quantum emission takes place as shown by straight line arrows in FIG. 34, while such non-emission transition of nP→nS or nP→nD as shown by wavy line arrows in the drawings can hardly occur in such event as a rarefied gas where atoms substantially have no chance of mutual collision. In a state where the luminous atoms are completely independent of one another and fixed in the atom as it is, the probability of the non-emission transition is made less as in the case of the rarefied gas, while the emission transition occurring from nP to nS or to nD as shown by solid line arrows is generally low in the probability, and the transitions from nP involve one to other levels shown by broken lines in FIG. 34 and the one from nP to nS or to nD should not be always excellent in the transition efficiency.

Figure 31:
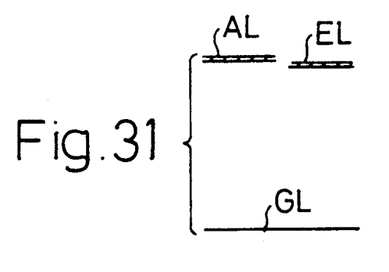
Figure 32:
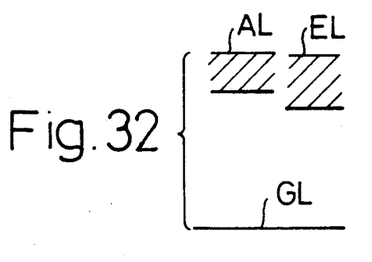

In the present embodiment, on the other hand, the superposition on each other of the mutually adjacent and equally excited energy levels in the photoconverter having the luminous atoms fixed in the atomic state within the pores 15 of such proper diameter as shown in FIG. 27 causes the levels to have a certain width, so that a level AL which is to achieve the absorption and excitation as well as an equal level EL in an adjacent series to execute a proper energy shift and broadening with respect to the ground level GL, the non-emission transition is caused by such superposition to occur at a high probability so as to allow as a whole the peculiar emission of the luminous atoms or the di-quantum emission transition to be extremely easily performed, and the emission efficiency can be remarkably elevated. In this case, the secondary calcining temperature excessively low and the pore diameter excessively large as in FIG. 28 result in such excessively small energy shift and broadening as shown in FIG. 31, while an excessively high secondary calcining temperature and an excessively small pore diameter as in FIG. 29 will result in such excessively large energy shift and broadening as shown in FIG. 32, and any desired excitation and emission transition process can be hardly attained.

Figure 33:
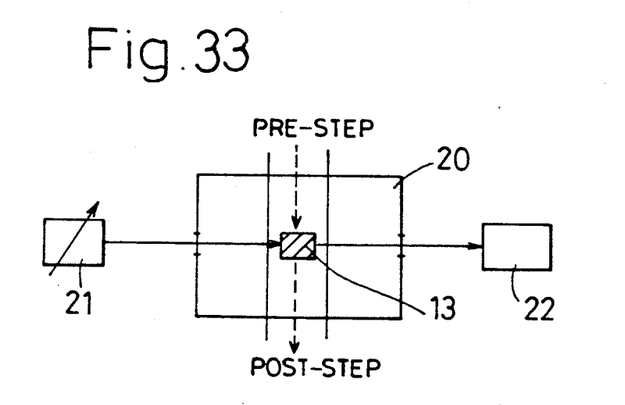
FIG. 33 is a diagram for explaining the adjustment and setting of the sintering temperature according to the present invention.

It is thus required to take the temperature setting and regulation sufficiently into consideration in the step of the secondary calcination. In this connection, if required, a proper secondary calcining temperature can be determined in such that, as shown in FIG. 33, a material to be tested which has been primarily calcined at a previous step is subjected to the secondary calcination within a sintering furnace 20 to obtain a testing photoconverter 13, during which secondary calcination the relationship between the sintering temperature and the fluorometric intensity are measured with a variable length laser 21 and a spectrometer 22 employed, and the proper temperature for the secondary calcination is determined in view of the thus measured sintering temperature upon obtention of excellent one of the testing photoconverter 13.

It should be appreciated on the other hand that the appropriate energy level shift and broadening are particularly effective in the event where, for example, the inherent excitation level of pure atom is not in conformity to the excited energy of the fixed atoms. That is, the former level can be made conforming to the excited energy, so that the excitation can be made to occur even in the atoms in the atomic state, and that, since the absorption and excitation efficiency can be elevated by setting the excitation energy level substantially at the same energy level as the excitation emission energy by means of the foregoing energy shift and broadening, a selection range of the luminous atom employed in the photoconverter or of an excitation light source can be sufficiently broadened.

In the present embodiment, other arragements are the same as those in the foregoing embodiment of FIGS. 1 or 12, and substantially the same function can be attained.

What is claimed is:

1. A photoconverter providing an emission specific to luminous atoms, said photoconverter comprising:
    a matrix substance permeable to visible light;
    a luminous substance having an energy level close to the energy level of said luminous atoms, said luminous substance being fixed in substantial individual isolation within said matrix substance, said luminous substance being for absorption of incident light from a radiation source to be thereby excited to convert said incident light into emitted light; and
    a sintered coating over a substrate, said coating prepared from a mixture solution of a matrix compound capable of forming a sol-gel film containing said matrix substance component with an acid chloride compound containing said luminous atoms, and being subjected to a calcination to be reduced and sintered into said substrate, wherein said luminous atoms are fixed in individual isolation in microfine pores formed in the coating by said calcination.

2. The photoconverter according to claim 1 wherein said matrix substance is at least one selected from the group consisting of $SiO_2$ and $Al_2O_3$.

3. The photoconverter according to claim 1 wherein said luminous atoms are of at least an element selected from the group consisting of Fe, Mn, Sr, Na, Li, In and Ni.

4. The photoconverter according to claim 3 wherein said luminous atoms are further of at least an element selected from the group consisting of Al, Co, Sn, Ta, V, W, Hf, Mg, Re, Si and Y.

5. The photoconverter according to claim 1 wherein said matrix compound is a silicone compound containing amorphous silica as said matrix substance and as said acid chloride compound a metallic atom salt.

6. The photoconverter according to claim 1 wherein said luminous atoms are of at least two different luminous atoms in a mixture, each of said different atoms showing a strong emission of at least one of red, green and blue colors.

7. The photoconverter according to claim 6 wherein said luminous atoms are of at least an element selected from the group consisting of Fe and Mn and at least an element selected from the group consisting of Sr and Li.

8. The photoconverter according to claim 2 wherein said luminous atoms are of Fe.

9. The photoconverter according to claim 2 wherein said luminous atoms are of Mn.

10. The photoconverter according to claim 1 wherein said coating is calcined at a calcining temperature set for causing an energy shift and broadening of excitation level of said luminous atoms to take place in an extent in whch the luminous atoms maintain their atomic state, upon said reduction and sintering.

11. The photoconverter according to claim 10 wherein said calcining temperature is so set that said photoconverter will have pores of a diameter effective to accommodate therein said luminous atoms upon said sintering and to cause an energy shift and broadening to occur.

12. The photoconverter according to claim 1, wherein said substrate includes a glass tube.

* * * * *